United States Patent
Frohs et al.

(10) Patent No.: US 10,377,672 B2
(45) Date of Patent: Aug. 13, 2019

(54) METHODS FOR PRODUCING POLYGRANULAR GRAPHITE BODIES

(71) Applicant: Showa Denko Carbon Germany GmbH, Meitingen (DE)

(72) Inventors: Wilhelm Frohs, Allmannshofen (DE); Rainer Schmitt, Augsburg (DE)

(73) Assignee: Showa Denko Carbon Germany GmbH, Meitingen (DE)

( * ) Notice: Subject to any disclaimer, the term of this patent is extended or adjusted under 35 U.S.C. 154(b) by 0 days.

(21) Appl. No.: 15/942,868

(22) Filed: Apr. 2, 2018

(65) Prior Publication Data

US 2018/0222803 A1  Aug. 9, 2018

Related U.S. Application Data

(63) Continuation of application No. PCT/EP2016/001878, filed on Nov. 11, 2016.

(30) Foreign Application Priority Data

Nov. 13, 2015 (DE) ........................ 10 2015 222 434

(51) Int. Cl.
*C04B 35/52* (2006.01)
*C04B 35/532* (2006.01)
*H05B 7/085* (2006.01)
*C21C 5/52* (2006.01)

(52) U.S. Cl.
CPC .......... *C04B 35/522* (2013.01); *C04B 35/521* (2013.01); *C04B 35/532* (2013.01); *H05B 7/085* (2013.01); *C04B 2235/422* (2013.01); *C04B 2235/616* (2013.01); *C04B 2235/9607* (2013.01); *C21C 5/52* (2013.01)

(58) Field of Classification Search
CPC ... C04B 35/522; C04B 35/532; C04B 35/521; C04B 2235/422; C04B 2235/9607; C04B 2235/616; H05B 7/085; C21C 5/52
USPC ........................................................ 423/448
See application file for complete search history.

(56) References Cited

U.S. PATENT DOCUMENTS

| 702,758 | A |  | 6/1902 | Acheson |
|---|---|---|---|---|
| 1,029,121 | A |  | 6/1912 | Héroult |
| 4,308,177 | A |  | 12/1981 | Tucker |
| 4,534,951 | A |  | 8/1985 | Kortovich et al. |
| 5,705,139 | A | * | 1/1998 | Stiller ................... C04B 35/532 423/445 R |
| 5,900,189 | A | * | 5/1999 | Kawano ................ C04B 35/532 252/502 |
| 2008/0003167 | A1 |  | 1/2008 | Miller et al. |
| 2012/0082593 | A1 | * | 4/2012 | Stiller .................... C10G 1/002 422/187 |
| 2013/0004410 | A1 |  | 1/2013 | Johansen et al. |

OTHER PUBLICATIONS

Burgess-Clifford, et al., The effect of calcination on reactive milling of anthracite as potential precursor for graphite production, Fuel Processing Technology 2009; 90: 1515-1523 (Year: 2009).*
International Search Report dated Feb. 13, 2017 for International Application No. PCT/EP2016/001878 (6 pages).
Caroline E. Burgess-Clifford et al., "The effect of calcination on reactive milling of anthracite as potential precursor for graphite production", Fuel Processing Technology, vol. 90, No. 12, Dec. 1, 2009, pp. 1515-1523 (9 pages).
Frank Hiltmann et al., "Anthracite Evaluation for Amorphous Cathodes", Light Metals, Table 5, p. 4, 2002 (6 pages).
Erich Fitzer et al., "The irreversible expansion behavior of sulfurous cokes in a temperature range of higher then 1000° C.", High Temperatures—High Pressures, vol. 9, pp. 243-250, 1977 (9 pages).

* cited by examiner

*Primary Examiner* — Daniel McCracken
(74) *Attorney, Agent, or Firm* — Taylor IP, P.C.

(57) ABSTRACT

A method for the production of polygranular graphite bodies including the step of provisioning a mixture including a high-temperature treated anthracite having a high vitrinite content and a petroleum-based needle coke and/or a pitch-based needle coke, and provisioning at least one binder coke precursor. The method also includes the steps of forming a green body from the mixture from the provisioning step, and carbonizing and graphitizing the green body.

8 Claims, 4 Drawing Sheets

METHODS FOR PRODUCING POLYGRANULAR GRAPHITE BODIES

CROSS REFERENCE TO RELATED APPLICATIONS

This is a continuation of PCT application No. PCT/EP2016/001878, entitled "NOVEL METHODS FOR PRODUCING POLYGRANULAR GRAPHITE BODIES", filed Nov. 11, 2016, which is incorporated herein by reference.

BACKGROUND OF THE INVENTION

1. Field of the Invention

The present invention relates to methods for the production of polygranular graphite bodies, as well as to the polygranular graphite bodies produced therewith.

2. Description of the Related Art

Polygranular graphite bodies are for example graphite electrodes and connecting pieces (nipples) for graphite electrodes. The following explanations relate in particular to graphite electrodes and nipples, but also apply correspondingly to polygranular graphite bodies other than graphite electrodes or nipples.

Graphite electrodes are used for steel production in an electric arc furnace. Graphite electrodes generally must withstand diverse mechanical stresses. In addition to temperature induced thermal material stresses, these include the mechanical stresses which arise on insulating elements during tilting of the furnace, due to vibration, due to dislocation of scrap during melting, as well as during placement of the strand into the scrap. To withstand the conditions in an electric arc furnace it is therefore generally essential that the relevant graphite electrode has a low coefficient of thermal expansion, low electrical resistance, sufficient density and the properties associated therewith (strength and E-modulus).

Needle cokes, for example petroleum-based or pitch-based needle cokes are generally used in the production for example, of graphite electrodes. The quality and value of needle coke which has a needle-like crystalline structure is determined by many factors such as, for example sulfur and nitrogen content, hardness, ash content, electrical resistance and coefficient of thermal expansion. To produce polygranular graphite bodies, such as graphite electrodes and nipples, two graphitization methods are generally used.

One method—the Acheson-graphitization method—was initially described in U.S. Pat. No. 702,758. The furnace consists of a horizontal bed of refractory materials, furnace heads that carry the current load to the furnace and long side walls, consisting of concrete blocks, steel plates or steel grids. The bottom is cooled by air and loaded with a layer of insulating material, for example granular silicon carbide, metallurgical coke, sand or sawdust. The same materials are used to insulate the side walls and the surface of the furnace.

Due to cheaper production costs however, the second method—the Castner—or lengthwise graphitization method—is the currently commonly used method in the production of graphite electrodes. The material to be graphitized is heated as an ohmic resistance in the direct passage of current to above 2200° C. to 3000° C. The original device for implementation of lengthwise graphitization is the subject of U.S. Pat. No. 1,029,121.

Nipples are used to connect graphite electrodes with one another. The graphite electrodes are herein equipped on their face with threaded boxes into which the nipples are screwed. Production of these nipples occurs generally also on the basis of needle cokes.

One problem that occurs in the use of pitch-based or petroleum-based needle cokes is so-called puffing. Puffing is understood to be the irreversible rapid volume expansion during graphitization in a temperature range of 1500 to 2000° C. that is caused by nitrogen- and sulfur release. This puffing can lead to mechanical stresses in polygranular graphite bodies, resulting in micro- and macro-tears. There is a danger that—due to the formation of tears—polygranular graphite bodies are produced that can only be viewed as rejects.

Because of the irreversible thermal volume expansion of the needle cokes, the process curves for graphitizing of, for example electrodes or nipples must generally be adapted very precisely to the parameters of the needle cokes which in the case of strong puffing behavior leads to longer process times and thus higher production costs. In addition, there may be a greater risk of producing reject products.

Petrol- and pitch-based needle cokes display different levels of puffing behavior. Compared to petroleum-based needle cokes, pitch-based needle cokes have a stronger nitrogen puffing-behavior, since they have a higher nitrogen content compared to petroleum-based needle cokes. During graphitization, this nitrogen is separated from its chemical compound, and largely escapes in gaseous form as elementary nitrogen from the material.

To diminish this puffing behavior, especially with pitch-based needle cokes, inhibitors such as iron oxide are typically added. The effect of iron oxide as an inhibitor is described for example in E. Fitzer et al., "The irreversible expansion behavior of sulfurous cokes in a temperature range of higher then 1000° C.", High Temperatures—High Pressures, volume 9, pages 243-250, 1977. However, the addition of iron oxide only reduces sulfur puffing, in other words, the addition of iron oxide has no effect upon nitrogen puffing in the graphitization process since the influence of iron oxide relates to the reduction of sulfur puffing What is needed in the art is a method for the production of polygranular graphite bodies, wherein puffing, especially nitrogen puffing in a temperature range of 1500° C. to 2000° C. is reduced, or ideally completely prevented.

SUMMARY OF THE INVENTION

The present invention provides a method for the production of polygranular graphite bodies, comprising the following steps:

a) Provision of a mixture including petroleum- and/or pitch-based needle cokes, high-temperature treated anthracite having a high vitrinite content and of at least one binder coke precursor;

b) Forming a green body from the mixture provided in step a):

c) Carbonizing and graphitizing the green body from step b).

According to the present invention, the high-temperature treated anthracite with a high vitrinite content has the effect of a puffing inhibitor, especially for nitrogen puffing.

The anthracites are generally characterized by good availability in both the green state and in the high-temperature treated state.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
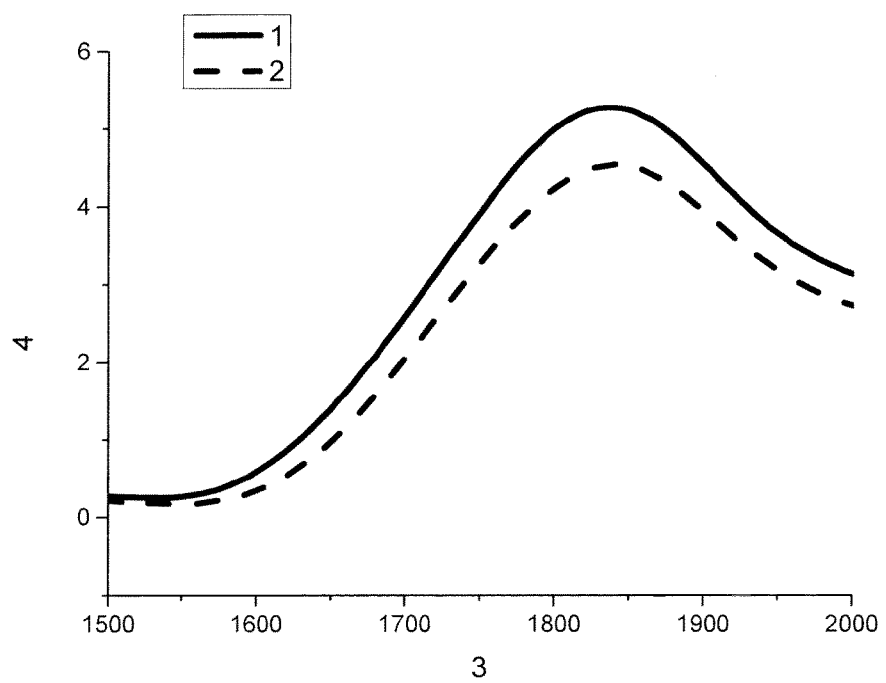
FIG. 1 is a graphical representation illustrating:
1 pitch needle coke=100%
2 pitch needle coke: anthracite=90 parts:10 parts
3 temperature [° C.]
4 expansion gradient [$10^{-3}$%/° C.]

Green anthracite is generally a coal having the highest carbonization level and a reflective surface. Compared to other coals, anthracites may have a low content of volatile components (<10 weight percent (weight-%), a density of approx. 1.3 to 1.4 g/cm$^3$ and a carbon content of >92 weight-%. The energy content ranges from approx. 26 MJ/kg to 33 MJ/kg. The maceral content, that is the content of organic rock-forming components should herein have a collinite content of >20%, for example >50% and a telinit content ≤45%, for example ≤20%.

High-temperature treated anthracite is understood to be an anthracite that was subjected to a thermal treatment in a temperature range of 2200 to 3000° C., such as 2300 to 2800° C., or 2400 to 2600° C. For thermal treatment of anthracites, all furnace technologies are basically suitable with which a thermal treatment of 2200° C. and higher is feasible, for example an electro-calcination, an Acheson-graphitization process or a lengthwise graphitization.

With this high-temperature treatment at 2200 to 3000° C., the x-ray amorphous structure of the anthracite can be transformed into a graphite like structure. An x-ray amorphous structure is characterized in that the long-range coverage is below the coherence length of the x-ray radiation that is used.

The term "Vitrinite content or Vitrinite factor" is explained for example on page 4, table 5 in the publication by F. Hiltmann et al—"Anthracite Evaluation for Amorphous Cathodes", Light Metals, 2002. Vitrinite as morphological component of coal is composed of telinit, the previous plant cell walls and collinite, the cell filling. The ribbon-like structure of this coal component is typical. Fanning out of this ribbon structure in the range of the graphitizing temperatures of higher than 2200° C. explains the lower CTE of these graphite types. In the context of the present invention, the vitrinite content as the sum of the collonite and telinit content may amount to >60%, for example >70%.

Below, the term "high-temperature treated anthracite" is used that can be equated with high-temperature treated anthracite having a high vitrinite content.

Within the scope of the present invention, coal-tar pitch-based needle cokes can be used as pitch-based needle cokes. If a mixture of petroleum- and pitch-based needle cokes is used for the production of the green mixture, any ratio of petroleum to pitch-based needle coke can be used.

A binding agent is usually a coal tar pitch or petroleum pitch which, when mixed with a granular carbon material results in a mixed carbon material. Binder coke is a component of carbon products, resulting from coking of the binder coke precursor during an annealing process.

According to the present invention, binder coke precursors can be selected from the group consisting of pitch, tar, bitumen, phenol resin, furan resin or any mixture thereof. The use of pitch may be desired, especially coal tar pitch.

In the current invention, the term "provision of a mixture" includes the steps of mixing and kneading. This mixture contains 2 to 30 weight percent (weight-%), for example 4 to 10 weight-% of the high-temperature treated anthracite, 40 to 95 weight-%, for example 70 to 85 weight-% of petroleum- or pitch-based needle cokes and 5 to 30 weight-%, for example 10 to 25 weight-% of the at least one binder coke precursor. The weight-% specifications relate to the green mixture, in other words, the components of this mixture always result in 100 weight-%. The resulting mixture is subsequently formed. According to the present invention, an optional compression may be included during forming. Forming and optional compression can occur for example through extrusion, pressing, i.e. isostatic pressing, vibratory compaction, i.e. shaking under vacuum. A formed green body results in which the particles are aligned, for example through extrusion to provide anisotropy, in other words a desired direction in the material. This can be advantageous for later use in the electric arc. Lower resistance occurs for example in longitudinal direction of the graphite electrode.

The addition of 2 to 30 weight-% of high-temperature treated anthracite results in the desired inhibitory effect since herein the present nitrogen levels in the green mixture can easily be attained with the aforementioned volumes of anthracite due to accessibility and distribution. Increasing the amount of anthracite in the green mixture does not result in an increase inhibitory effect. Superfluous anthracite can thus only be viewed as an additive. The range of 4 to 10 weight-% of the high-temperature treated anthracite in the green mixture results in suppression of an essential part of the nitrogen-puffing and thus represents a minimum range that is necessary to achieve nitrogen puffing.

In the context of the present invention, the high-temperature treated anthracite particles that are added to the green mixture may have a diameter $d_{50}$ of 0.2 to 25 mm, for example of 0.5 to 15 mm, for example of 1.0 to 10 mm, and for example 1.25 to 6.0 mm. The $d_{50}$ value specifies the median particle size, whereby 50% of the particles are smaller than the specified value. One advantage of these predefined diameters is achieving high density or respectively low porosity.

In a subsequent step of the method according to the present invention, the shaped green body is carbonized at 700 to 1300° C. and graphitized at 2200 to 3000° C. After carbonization an optional impregnation step with pitch can occur, for example at 70 to 180° C. After this impregnation step, a carbonization step may again be implemented. This change from carbonization to impregnation step may occur up to 2 times before the graphitization step is implemented. Impregnation increases the strength of the polygranular graphite body, for example a graphite electrode.

According to one another embodiment of the present invention, the high-temperature treated anthracite and if necessary the petroleum-based and/or pitch-based needle coke is graded prior to metering.

Grading means separation according to certain particle sizes. Due to the separation according to certain particle sizes it is possible to produce an as dense an electrode as possible, since herein the suitable amounts of various particle sizes can be selected to achieve dense packing.

Needle cokes are generally produced with the assistance of a delayed coker. Here, petroleum residues or coal tar pitch are coked to needle cokes. The delayed coker is a device used in an oil refinery in which macromolecular, viscous residues are coked (delayed coking process). The delayed coker may consist essentially of two units: one coker furnace and two alternately impinged coke drums. In a coker furnace the residues can be heated to approximately 500-600° C., for example to 500-550° C. The coker drums can be operated at a maximum pressure of 0.9 MPa.

The present invention also provided an alternative method for the production of polygranular graphite bodies, wherein during coking of petroleum resides or coal tar pitch to needle coke, high-temperature treated anthracite with a high vitrinite content is added. This is done in a manner that the high-temperature treated anthracite is metered over the topside of the drum of a delayed coker either as a solid material and/or as a solid-liquid suspension with a carrier fluid—in the case of a solid-liquid suspension, for example with a viscous refinery product as the carrier fluid—and that the high-temperature treated anthracite sinks through the gas phase to the still liquid phase and that during the solid-phase conversion the high-temperature treated anthracite is embedded in the coke matrix that is being formed.

The thus obtained needle coke is mixed with at least one binder precursor, in other words a green mixture is being obtained.

The additional steps of this method according to the present invention are analogous to the initially described method.

Polygranular graphite bodies that are obtained by the process according to the present invention are an additional object of the current invention. These graphite bodies can be graphite electrodes or nipples. During operation, that is when used in an electric arc furnace these graphite bodies display surprisingly good operational characteristics, since tears in the material are hardly detectable. In addition, the reject quota can be significantly reduced by the inventive method, resulting in lower production costs.

All explanations relating to the first method also apply to this additional method.

In one embodiment, 58 weight-% of a petroleum-based needle coke are mixed with 20 weight-% of an anthracite having a vitrinite content of 77.5% that was pre-treated at 2400° C. and are pressed with additional 22 weight-% pitch to a green formed body, are carbonized at 1200° C. and graphitized at 2800° C. The maximum volume expansion is herein 2.81% and the expansion gradient is 1.13 [$10^{-3}$%/° C.]. The electric resistance can be 11 ohm/micrometer.

A reference sample with 79 weight-% of a petroleum-based needle coke was mixed according to the aforementioned method with 21 weight-% pitch, carbonized and graphitized. The maximum volume expansion is hereby 4.88% and the expansion gradient is 1.72 [$10^{-3}$%/° C.] and is thus approximately 50% worse. The electric resistance is 8 ohm/micrometer and the CTE is 0.22 [μm/mK] and is thus at the same level as the above anthracite mixture.

Figure 2:
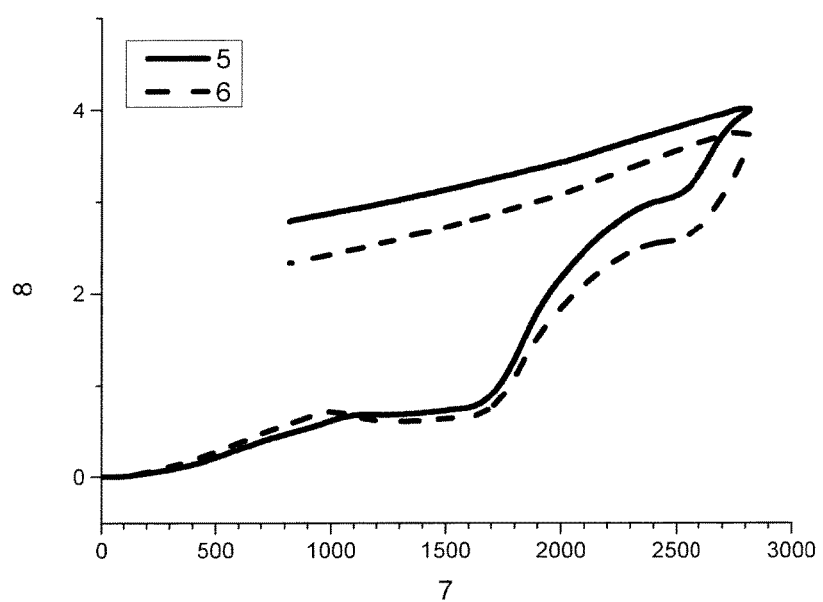
FIG. 2 is a graphical representation illustrating:
5 pitch needle coke=100%
6 pitch needle coke:anthracite=90 parts:10 parts
7 temperature [° C.]
8 maximum volume expansion [%]
Figure 3:
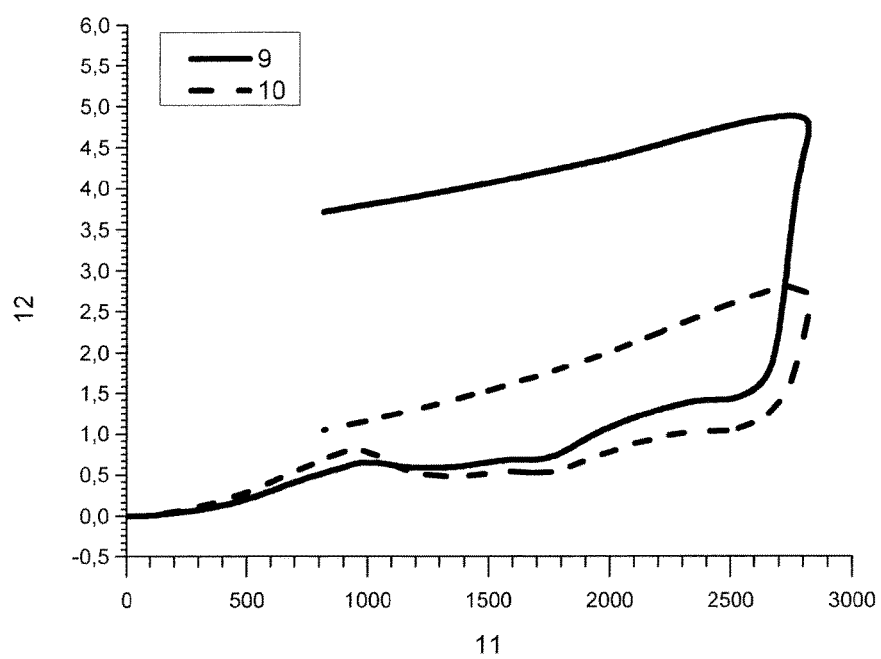
FIG. 3 is a graphical representation illustrating:
9 pitch needle coke=100%
10 pitch needle coke:anthracite=75 parts:25 parts
11 temperature [° C.]
12 maximum volume expansion [%]
Figure 4:
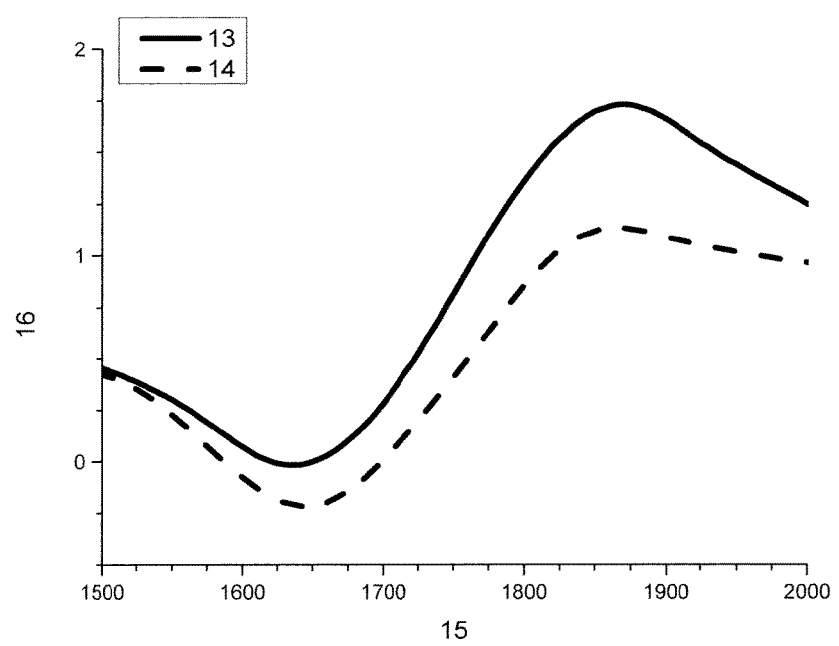
FIG. 4 is a graphical representation illustrating:
13 pitch needle coke=100%
14 pitch needle coke:anthracite=75 parts:25 parts
15 temperature [° C.]
16 expansion gradient [$10^{-3}$%/° C.].

FIG. 1 illustrates that the expansion gradient is reduced by approximately 10% through the addition of 8 weight-% anthracite. FIG. 2 illustrates that a reduction of the volume expansion of approximately 15% occurs due to the addition of 8 weight-% anthracite. FIG. 3 illustrates that a reduction in the volume expansion of approximately 50% occurs due to the addition of 20 weight-% anthracite. FIG. 4 illustrates that the expansion gradient is reduced by approximately 20% due to the addition of 20 weight-% anthracite.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for the production of polygranular graphite bodies, comprising the steps of:
    a) provisioning a mixture including a high-temperature treated anthracite having a high vitrinite content and at least one of a petroleum-based needle coke and a pitch-based needle coke, and provisioning at least one binder coke precursor;
    b) forming a green body from said mixture provided in step a); and
    c) carbonizing and graphitizing said green body from step b), wherein a share of the high-temperature treated anthracite is 2 to 30 weight-%, a share of at least one of the petroleum-based needle coke and the pitch-based needle coke is 40 to 95 weight-%, and a share of said at least one binder coke precursor is 5 to 30 weight-%.

2. The method according to claim 1, wherein said method step c) includes a step of impregnating said green body with a pitch after carbonization and prior to graphitization.

3. The method according to claim 2, wherein up to two steps of impregnating said green body with said pitch occur.

4. The method according to claim 1, wherein said at least one binder coke precursor is selected from a group consisting of at least one of a pitch, a tar, a bitumen, a phenol resin, and a furan resin.

5. A method for the production of polygranular graphite bodies, comprising the steps of:
    a) adding a high-temperature treated anthracite, which has a high vitrinite content, to petroleum residues or coal tar pitch in a delayed coker;
    b) coking said mixture from step a) to a needle coke;
    c) provisioning a mixture including the needle coke from step b) and at least one binder coke precursor;
    d) forming a green body from said mixture in step c); and
    e) carbonizing and graphitizing said green body in step d), wherein a share of the high-temperature treated anthracite is 2 to 30 weight-%, a share of at least one of the petroleum-based needle coke and the pitch-based needle coke is 40 to 95 weight-%, and a share of said at least one binder coke precursor is 5 to 30 weight-%.

6. The method according to claim 5, wherein said step e) includes a step of impregnating said green body with a pitch after carbonization and prior to graphitization.

7. The method according to claim 6, wherein up to two steps of impregnating said green body with said pitch occur.

8. The method according to claim 5, wherein said at least one binder coke precursor is selected from a group consisting of at least one of a pitch, a tar, a bitumen, a phenol resin, and a furan resin.

* * * * *

UNITED STATES PATENT AND TRADEMARK OFFICE
CERTIFICATE OF CORRECTION

PATENT NO. : 10,377,672 B2
APPLICATION NO. : 15/942868
DATED : August 13, 2019
INVENTOR(S) : Frohs et al.

It is certified that error appears in the above-identified patent and that said Letters Patent is hereby corrected as shown below:

In the Specification

Column 3
At Line 43, please delete "≤45%, for example ≤20%.", and substitute therefore --≥45%, for example ≥20%.--.

Signed and Sealed this
Twenty-seventh Day of October, 2020

Andrei Iancu
*Director of the United States Patent and Trademark Office*